(12) United States Patent
Johnson

(10) Patent No.: US 10,588,431 B2
(45) Date of Patent: Mar. 17, 2020

(54) ROTATABLE PRODUCT DISPLAY BRACKET

(71) Applicant: Target Brands, Inc., Minneapolis, MN (US)

(72) Inventor: Jason W. Johnson, Wayzata, MN (US)

(73) Assignee: Target Brands, Inc., Minneapolis, MN (US)

( * ) Notice: Subject to any disclaimer, the term of this patent is extended or adjusted under 35 U.S.C. 154(b) by 121 days.

(21) Appl. No.: 15/942,978

(22) Filed: Apr. 2, 2018

(65) Prior Publication Data
US 2019/0298085 A1    Oct. 3, 2019

(51) Int. Cl.
*A47B 96/00*    (2006.01)
*A47F 5/00*    (2006.01)
*F16M 13/02*    (2006.01)

(52) U.S. Cl.
CPC ......... *A47F 5/0087* (2013.01); *F16M 13/022* (2013.01); *F16M 2200/021* (2013.01)

(58) Field of Classification Search
CPC ............... A47F 5/0087; F16M 13/022; F16M 2200/021
USPC .......... 248/214, 206.5, 683, 309.4; 362/382, 362/287, 398, 418, 249.01
See application file for complete search history.

(56) References Cited

U.S. PATENT DOCUMENTS

| | | | |
|---|---|---|---|
| 1,608,325 A | 11/1926 | Lang | |
| 1,821,024 A | 9/1931 | Noble | |
| 1,949,023 A | 2/1934 | Marshall | |
| 2,931,513 A * | 4/1960 | Cignoli | A47F 7/08 211/35 |
| 5,495,937 A | 3/1996 | Fraser | |
| 5,547,157 A | 8/1996 | Hsiao | |
| 5,662,301 A | 9/1997 | Fard | |
| 6,161,708 A | 12/2000 | Myler | |
| 6,588,920 B2 * | 7/2003 | Agro | F21S 8/06 362/287 |
| 7,209,038 B1 | 4/2007 | Deconinck et al. | |
| 7,806,236 B2 | 10/2010 | Scholen et al. | |
| 9,714,528 B2 | 7/2017 | Van Balen | |
| 2009/0090035 A1 | 4/2009 | Murray | |
| 2017/0051865 A1 * | 2/2017 | Chen | F16M 11/041 |

* cited by examiner

*Primary Examiner* — Todd M Epps
(74) *Attorney, Agent, or Firm* — Leanne Taveggia Farrell; Westman, Champlin & Koehler, P.A.

(57) ABSTRACT

A rotatable product display bracket includes a fixed portion and a rotatable portion coupled to the fixed portion. The rotatable portion includes an extension and a display support. The display support is configured to secure a product for display. In a resting position, the rotatable portion orients the product so that a top of the product faces in an upwardly direction. In a rotated position, the rotatable portion is rotated relative to the fixed portion so that the top of the product is oriented in a different direction than the upwardly direction. The rotatable portion is configured to automatically return to the resting position.

20 Claims, 6 Drawing Sheets

ROTATABLE PRODUCT DISPLAY BRACKET

BACKGROUND

Businesses, such as retail stores, use a variety of types of display structures to present products and related information to customers for purchase. A bracket is one type of component that is used with a display structure to support hanging products that are being offered for sale. Exemplary brackets may mount to cross bars that are attached to uprights on a gondola display unit.

The discussion above is merely provided for general background information and is not intended to be used as an aid in determining the scope of the claimed subject matter.

SUMMARY

A rotatable product display bracket includes a fixed portion and a rotatable portion coupled to the fixed portion. The rotatable portion includes an extension and a display support. The display support is configured to secure a product for display. In a resting position, the rotatable portion orients the product so that a top of the product faces in an upwardly direction. In a rotated position, the rotatable portion is rotatable relative to the fixed portion so that the top of the product is oriented in a different direction than the upwardly direction. The rotatable portion is configured to automatically return to the resting position.

A rotatable product display bracket is coupled to a cross bar and is configured to display a product. The rotatable product display bracket includes a fixed portion, a rotatable portion, a pivot and at least one magnet. The pivot is configured to rotate the rotatable portion relative to the fixed portion from a resting position to a rotated position. The at least one magnet configured to automatically rotate the rotatable portion from the rotated position to the resting position.

A method of displaying a product includes securing a product to a rotatable product display bracket having a fixed portion and a rotatable portion. The product is affixed to the rotatable portion and a top of the product faces in an upwardly direction when the rotatable portion is in a resting position. The method further includes rotating the rotatable portion of the rotatable product display bracket relative to the fixed portion of the rotatable product display bracket when a user turns the product so that the top of the product faces in a different direction than the upwardly direction. The method also includes automatically returning the rotatable portion of the rotatable product display bracket back to the resting position when the user releases the product by automatically rotating the rotatable portion to the resting position.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Guests or customers come to a retail store to shop, and often before deciding on a product to purchase, the customer would like to engage with an in-store display model to learn about its features and functions. Vacuum cleaners are a type of product that includes display models for customer engagement. Example vacuum cleaners in the market include upright, drum, canister, handheld or backpack type vacuum cleaners that may entirely be pushed or pulled around for manual cleaning and in some cases utilize a wand. These types of vacuums are easy for a guest or customer to engage with for demonstration purposes. Another subset of vacuum cleaners are robotic. These machines move autonomously while collecting dust and debris. The features and functions of these types of vacuum cleaners are more difficult for a guest or customer to learn about in a retail store. Embodiments described herein provide a product display fixture with rotatable product display brackets that support robotic vacuum cleaners for a more valuable guest or customer interactive experience.

Figure 1:
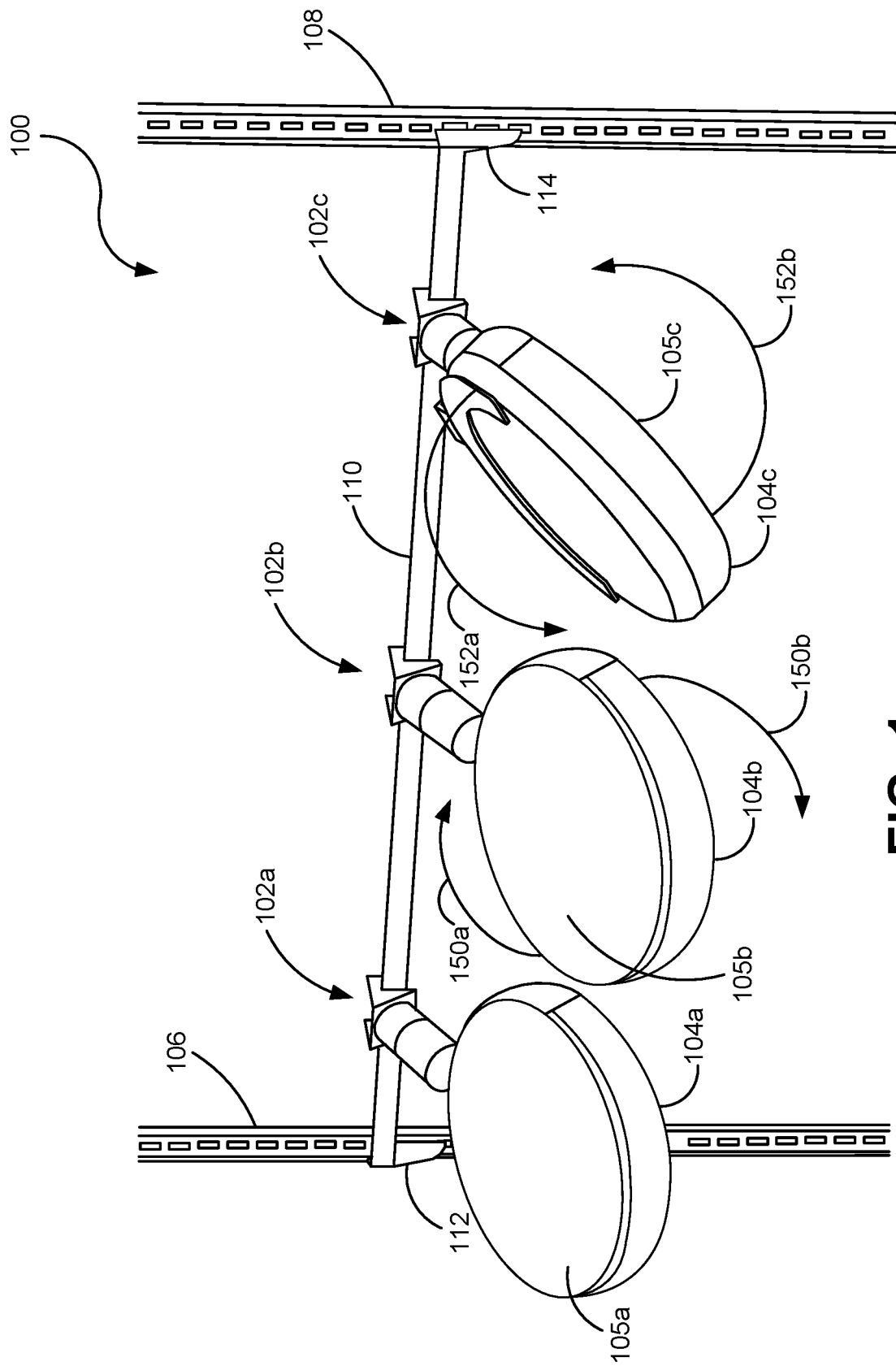
FIG. 1 is a perspective view of a product display fixture including a plurality of rotatable product display brackets mounted to a cross bar and each supporting a product according to an embodiment.

FIG. 1 is a perspective view of a product display fixture 100 including a plurality of rotatable product display brackets 102a, 102b and 102c according to an embodiment. Each rotatable product display bracket 102a, 102b and 102c is mounted to a cross bar 110 of product display fixture 100 and each rotatable product display bracket 102a, 102b and 102d supports a product or, in this embodiment, a robotic vacuum cleaner 104a, 104b and 104c. Product display fixture 100 includes a pair of uprights 106 and 108. A left side bracket 112 of cross bar 110 mounts into the slot(s) of the left side upright 106 and a right side bracket 114 of cross bar 110 mounts into the slot(s) of the right side upright 108. As illustrated in FIG. 1, rotatable product display brackets 102a and 102b are in resting positions and therefore products 104a and 104b are positioned so that tops 105a and 105b of products 104a and 104b are facing in an upwardly direction. Rotatable product display bracket 104c is in the process of being turned by a user, such as a customer or guest, so that sides and a bottom of product 104c may be viewed and top 105c faces a different direction than the upwardly direction that tops 105a and 105b face.

Figure 2:
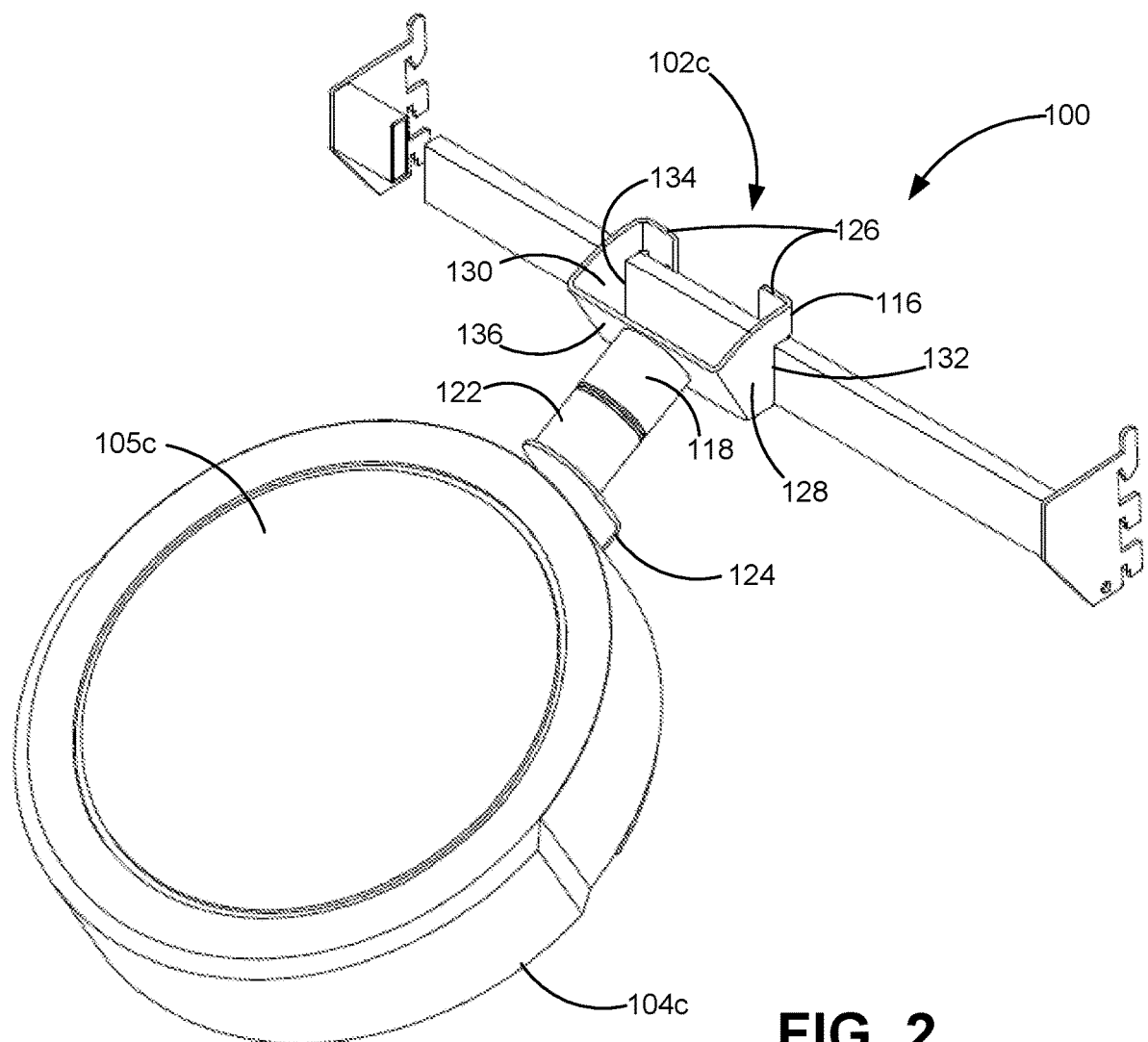
FIG. 2 is a top perspective view of one rotatable product display bracket mounted to the product display fixture and supporting a product in a resting position according to an embodiment.
Figure 3:
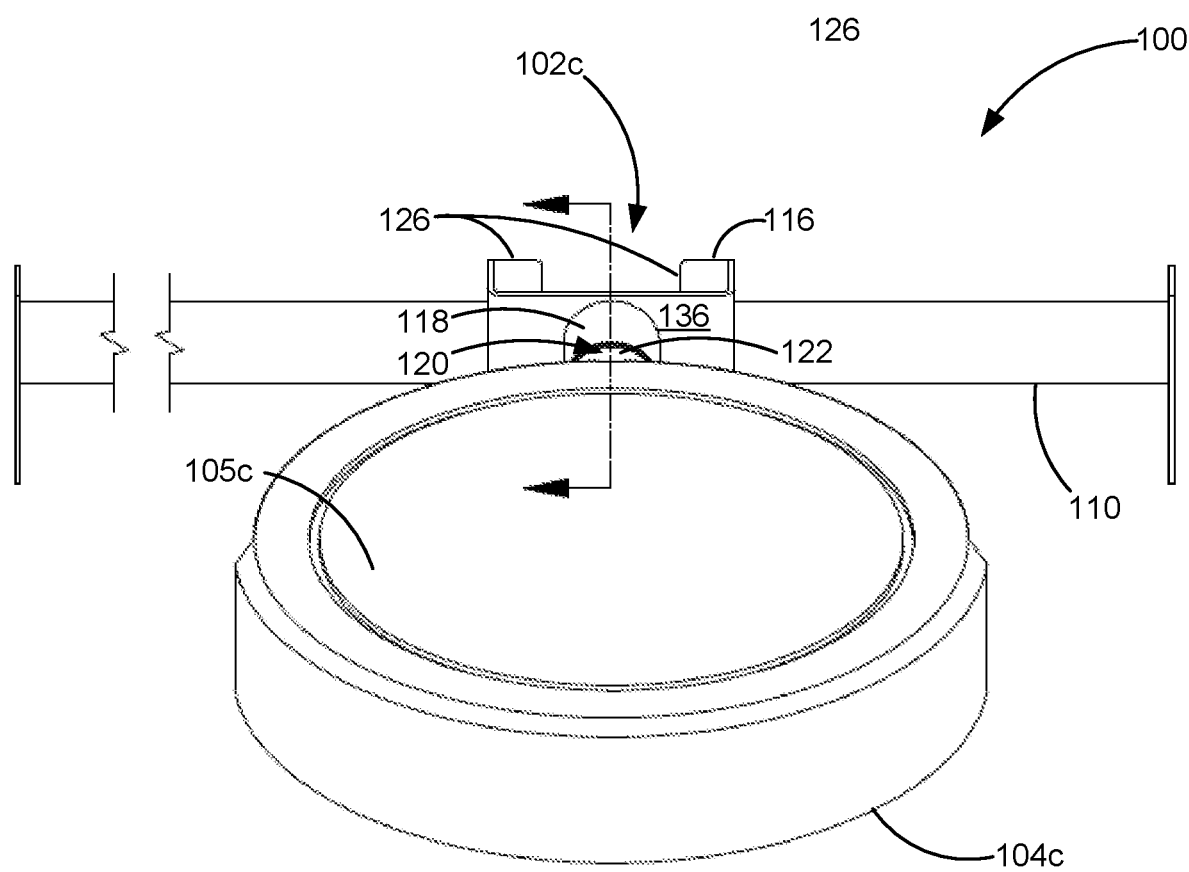
FIG. 3 is a front view of FIG. 2.
Figure 4:
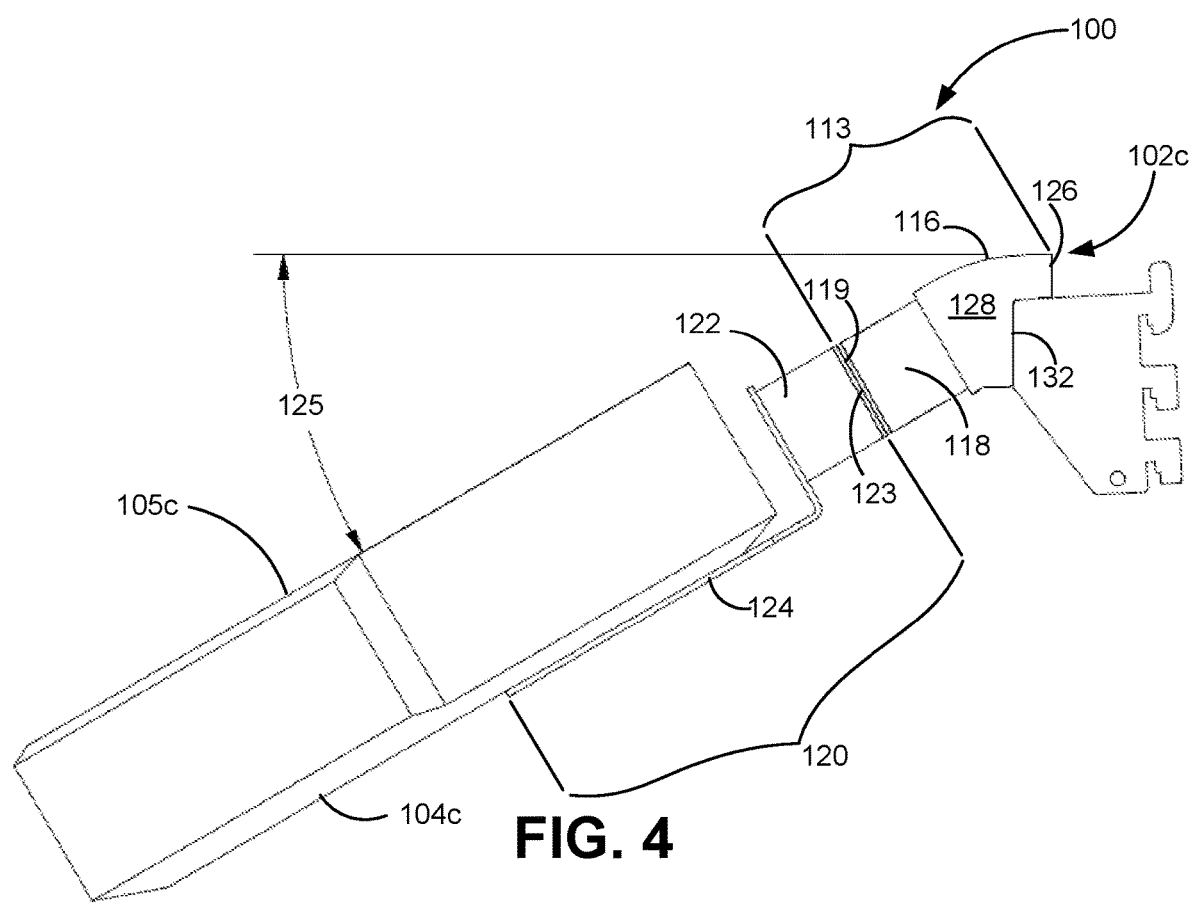
FIG. 4 is a right side view of FIG. 2.
Figure 5:
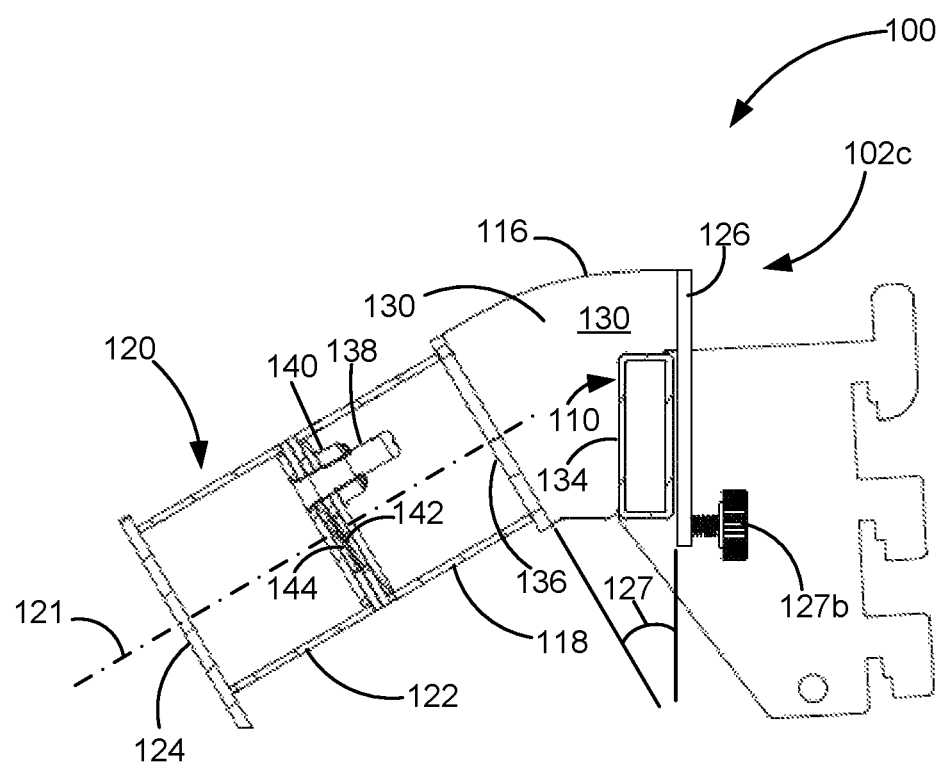
FIG. 5 is an enlarged detailed sectional view of the rotatable product display bracket and cross bar taken through the line indicated in FIG. 3.

FIG. 2 is a top perspective view of rotatable product display bracket 102c mounted to cross bar 110 of product display fixture 100 according to an embodiment. As illustrated in FIG. 2, rotatable product display bracket 102c is supporting product 104c in a resting position. FIG. 3 is a front view of FIG. 2, FIG. 4 is a right side view of FIG. 2 and FIG. 5 is an enlarged detailed sectional view of rotatable product display bracket 102c and cross bar 110 of product display fixture 100 taken through the line indicated in FIG. 3. Each of rotatable product display brackets 102a, 102b and 102c are substantially identical, so a detailed discussion of the components and features of rotatable product display bracket 102c also applies to rotatable product display brackets 102a and 102b.

Rotatable product display bracket 102c includes a fixed portion 113 and a rotatable portion 120 (see FIG. 4). Rotatable portion 120 is coupled to fixed portion 113. Fixed portion 113 includes a mount 116 and a main body 118. Mount 116 is coupled to or attached to cross bar 110 of product display fixture 100 and main body 118 extends forward from mount 116. As illustrated in the figures and in particular in the FIG. 5 sectional view, mount 116 is a saddle mount and includes a back flange 126 that receives at least one fastener, such as screws 127a and 127b, for tightening and fastening back flange 126 of mount 116 to a back side of cross bar 110, a pair of opposing side flanges 128 and 130 that include cutouts 132 and 134 that receive cross bar 110 and a front flange 136. While back flange 126 is oriented vertically, front flange 136 is oriented at an angle 127 (See FIG. 5) relative to back flange 126. Main body 118 of fixed portion 113 extends forward from front flange 136 and terminates at a front surface 119.

Rotatable portion 120 includes an extension 122 and a display support 124. Extension 122 is the component of rotatable portion that couples to main body 118 of fixed portion 113 so that a back surface 123 of extension 122 is centered on and located adjacent to front surface 119 of main body 118 along an axis 121 when rotatable portion 120 is in a resting position as illustrated in FIGS. 2-5. Display support 124 is configured to receive and secure a bottom of product 104c.

Both main body 118 of fixed portion 113 and extension 122 of rotatable portion 120 are tubular and hollow in shape as illustrated more clearly in the FIG. 5 sectional view. A bottom of vacuum 104c is mounted to display support 124. This positioning allows top 105c of vacuum 104c to face in an upwardly direction toward a customer for viewing when rotatable portion 120 is in the resting position. In addition, because front flange 136 of mount 116 is oriented at angle 127 relative to back flange 126 of mount 116, top 105c of vacuum 104c is located in a downwardly angle 125 (see FIG. 4) relative to horizontal. In one embodiment, angle 125 is substantially equal to thirty degrees.

Rotatable product display bracket 102c also includes a pivot stud 138 as illustrated in FIG. 5. Pivot stud 138 extends from extension 122 of rotatable portion 120 and is connected to main body 118 through an opening in front surface 119. The opening is surrounded by a nut 140. In addition, front surface 119 of main body 118 and back surface 123 of extension 122 each include opposing rare earth magnets 142 and 144, respectively. First magnet 142 is located on front surface 119 of main body 118 and opposing second magnet 144 is located on back surface 123 of extension 122.

In the resting position illustrated by rotatable product display brackets 102a and 102b in FIG. 1 and by rotatable product display bracket 102c in FIGS. 2-5, back surface 123 of extension 122 is centered on and located adjacent to front surface 119 of main body 118 along axis 121. In addition, tops 105a and 105c of products 104a and 104b in FIG. 1 and top 105 of product 104c in FIGS. 2-5 face in an upwardly direction.

Figure 6:
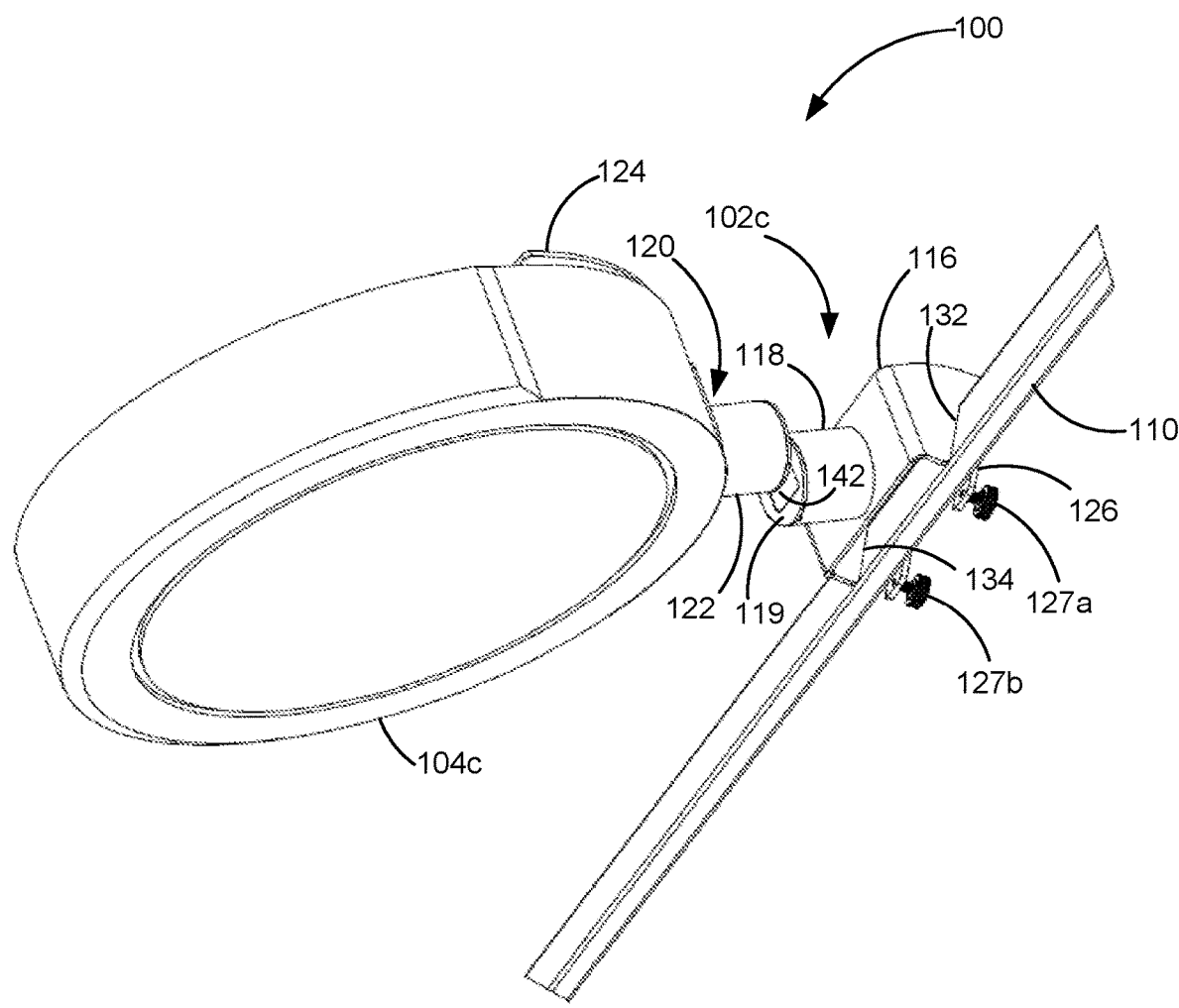
FIG. 6 is a bottom perspective view of FIG. 2 with the supported product in a rotated position.

To rotate rotatable portion 120 from the resting position to a rotated position as illustrated by rotatable product display bracket 102c in FIG. 1 and in FIG. 6, reference is made to the directional arrows 150a and 150b in FIG. 1. More specifically, a user, such as a customer or guest, may turn product 104c so that rather than top 105c of vacuum 104c being oriented towards the user or facing in the upwardly direction, the bottom of the vacuum or any other surface in between is oriented towards the user and top 105c faces in a different direction than the upwardly direction. In other words, the pivoting of pivot stud 138 permits or is configured to rotate rotatable portion 120 relative to fixed portion 113 from a resting position to a rotated position. As illustrated in FIG. 1 and as shown with vacuum 104b, the user turns vacuum 104b in a clockwise direction as illustrated by arrows 150a and 150b to rotate the vacuum 104b and rotatable portion 120 from a resting position to a rotated position. In this way, extension 122 and display support 124 of rotatable portion 120 are rotated about pivot stud 138 and are rotated relative to main body 118 and mount 116 of fixed portion 113. In the rotated position, back surface 123 of extension 122 is located adjacent to front surface 119 of main body 118 but out of alignment with axis 121.

When the user releases the vacuum, the vacuum and therefore rotatable portion 120 will automatically rotate counter clockwise to return to a resting position as illustrated by directional arrows 152a and 152b in FIG. 1. More specifically, rotatable product display brackets 102a, 102b and 102c act to automatically return the vacuum so that top 105c of vacuum 104c faces in the upwardly direction towards the user. As illustrated in FIG. 1 and as shown with vacuum 104c, rotatable portion 120 automatically rotates in a counter clockwise direction as illustrated by arrows 152a and 152b in order to rotate the vacuum from a rotated position to a resting position. At least one magnet, such as first and second magnets 142 and 144, provide a magnetic force that automatically rotates and returns rotatable portion 120 to the resting position. In this way, extension 122 and display support 124 are rotated back about pivot stud 138 under the magnetic force exerted by the magnets 142 and 144 to a position where back surface 123 of extension 122 is again centered on front surface 119 of main body 118 along axis 121.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A rotatable product display bracket comprising:
   a fixed portion; and
   a rotatable portion coupled to the fixed portion and including an extension and a display support, the display support configured to secure a product for display;
   wherein in a resting position the rotatable portion orients the product so that a top of the product faces in an upwardly direction;
   wherein in a rotated position, the rotatable portion is rotated relative to the fixed portion so that the top of the product is oriented in a different direction than the upwardly direction; and
   wherein the rotatable portion is configured to automatically return to the resting position.

2. The rotatable product display bracket of claim 1, wherein the fixed portion comprises a mount and a main body, wherein the mount is configured to attach to a cross bar and the main body extends forward from the mount.

3. The rotatable product display bracket of claim 2, wherein the mount comprises a saddle mount and includes a back flange, a pair of opposing side flanges each with a cutout and a front flange that is angled relative to the back flange, wherein the main body is attached to and extends forward from the front flange of the mount.

4. The rotatable product display bracket of claim 3, wherein the cutouts in the side flanges of the saddle mount receive the cross bar and at least one fastener fastens the back flange of the mount to a back side of the cross bar.

5. The rotatable product display bracket of claim 2, further comprising a pivot stud that extends from the extension of the rotatable portion and is connected to the main body of the fixed portion, wherein in the resting position a back surface of the extension is centered on and located adjacent to a front surface of the main body along an axis and wherein in a rotated position the pivot stud permits the rotatable portion to rotate relative to the fixed portion so that the back surface of the extension is located adjacent to the front surface of the main body but out of alignment with the axis.

6. The rotatable product display bracket of claim 5, further comprising a first magnet located on the front surface of the main body and a second magnet located on the back surface of the extension, wherein the first and second magnets provide a magnetic force that automatically returns the rotatable portion to the resting position.

7. The rotatable product display bracket of claim 1, wherein in the resting position the top of the product is located downwardly at an angle relative to horizontal.

8. The rotatable product display bracket of claim 1, wherein the rotatable portion is configured to rotate the product clockwise into the rotated position and the rotatable portion is configured to automatically rotate the product counter clockwise to return to the resting position.

9. A rotatable product display bracket coupled to a cross bar and configured to display a product, the rotatable product display bracket comprising:
   a fixed portion;
   a rotatable portion;
   a pivot configured to rotate the rotatable portion relative to the fixed portion from a resting position to a rotated position; and
   at least one magnet configured to automatically rotate the rotatable portion from the rotated position to the resting position.

10. The rotatable product display bracket of claim 9, wherein the fixed portion comprises a mount and a main body, wherein the mount attaches to the cross bar and the main body extends forward from the mount.

11. The rotatable product display bracket of claim 10, wherein the mount comprises a saddle mount and includes a back flange, a pair of opposing side flanges each with a cutout and a front flange that is angled relative to the back flange, wherein the main body is attached to and extends forward from the front flange of the mount.

12. The rotatable product display bracket of claim 11, wherein the cutouts in the side flanges of the saddle mount receive the cross bar and at least one fastener fastens the back flange of the mount to a back side of the cross bar.

13. The rotatable product display bracket of claim 10, wherein the pivot comprises a pivot stud that extends from the extension of the rotatable portion and is connected to a main body of the fixed portion, wherein in the resting position a back surface of the extension is centered on and located adjacent to a front surface of the main body along an axis and wherein in a rotated position the pivot stud permits the rotatable portion to rotate relative to the fixed portion so that the back surface of the extension is located adjacent to the front surface of the main body but out of alignment with the axis.

14. The rotatable product display bracket of claim 9, wherein the rotatable portion comprises an extension and a display support configured to secure the product for display.

15. The rotatable product display bracket of claim 9, wherein the at least one magnet comprises a first magnet located on a front surface of the fixed portion and a second magnet located on a back surface of the rotatable portion, wherein the first and second magnets provide a magnetic force that automatically rotates the rotatable portion to return the rotatable portion to the resting position.

16. The rotatable product display bracket of claim 9, wherein the product is secured by a display support of the rotatable portion and when in the resting position the top of the product is located at a downwardly angle relative to horizontal.

17. The rotatable product display bracket of claim 16, wherein a top of the product faces in an upwardly direction when the rotatable portion is in a resting position.

18. A method of displaying a product comprising:
   securing a product to a rotatable product display bracket having a fixed portion and a rotatable portion, wherein the product is affixed to the rotatable portion and a top of the product faces in an upwardly direction when the rotatable portion is in a resting position; and
   permitting the rotatable portion of the rotatable product display bracket to be rotated relative to the fixed portion of the rotatable product display bracket so that the top of the product faces in a different direction than the upwardly direction and so when the product is released the rotatable portion of the rotatable product display bracket automatically returns to the resting position.

19. The method of claim 18, wherein securing the product to the rotatable product display bracket comprises securing the product to the rotatable product display bracket so that in the resting position the top of the product is located at a downwardly angle relative to horizontal.

20. The method of claim 18, wherein the product is rotated clockwise when rotated and the product returns to the resting position by automatically rotating counter clockwise.

* * * * *